United States Patent
Brett et al.

(10) Patent No.: US 6,873,370 B1
(45) Date of Patent: Mar. 29, 2005

(54) METHOD AND CIRCUIT ARRANGEMENT FOR PICTURE-IN-PICTURE FADE-IN

(75) Inventors: Maik Brett, Hofheim (DE); Marko Hahn, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/958,493

(22) PCT Filed: Apr. 3, 2000

(86) PCT No.: PCT/DE00/01002
§ 371 (c)(1),
(2), (4) Date: Oct. 10, 2001

(87) PCT Pub. No.: WO00/62534
PCT Pub. Date: Oct. 19, 2000

(30) Foreign Application Priority Data

Apr. 13, 1999  (DE) .......................... 199 16 633

(51) Int. Cl.[7] .............................................. H04N 5/445
(52) U.S. Cl. ...................... 348/567; 348/511; 348/718
(58) Field of Search ................. 348/567, 565, 348/714, 716, 718, 584, 511, 595; 345/281

(56) References Cited

U.S. PATENT DOCUMENTS

| | | | | |
|---|---|---|---|---|
| 4,249,213 A | * | 2/1981 | Imaide et al. ............... | 348/565 |
| 4,821,086 A | * | 4/1989 | McNeely et al. ............ | 348/566 |
| 5,369,442 A | | 11/1994 | Braun ......................... | 348/567 |
| 5,434,625 A | * | 7/1995 | Willis .......................... | 348/564 |
| 6,160,590 A | * | 12/2000 | Shimizu et al. ............. | 348/581 |

FOREIGN PATENT DOCUMENTS

| | | |
|---|---|---|
| DE | 29 27 133 A1 | 4/1980 |
| DE | 195 34 781 | 9/1995 |
| EP | 0 304 236 | 2/1989 |
| EP | 0 411 548 A2 | 2/1991 |
| EP | 0 471 878 A1 | 2/1992 |
| GB | 2 215 954 A | 9/1989 |

* cited by examiner

Primary Examiner—Victor R. Kostak
(74) Attorney, Agent, or Firm—Edwards & Angell, LLP; Peter F. Corless; George W. Hartnell, III

(57) ABSTRACT

A method and a circuit arrangement for picture-in-picture insertion are described, in which, in order to prevent a write operation from being overtaken by a read operation and also to avoid the associated picture disturbances, a field is stored under an address which precedes a previous field by a number of N lines. A read address is then shifted to the same line of the older field in the event of a minimum distance to a write address being undershot.

3 Claims, 2 Drawing Sheets

METHOD AND CIRCUIT ARRANGEMENT FOR PICTURE-IN-PICTURE FADE-IN

BACKGROUND OF THE INVENTION

1. Field of the Invention

The invention relates to a method for picture-in-picture insertion, in which a sequence of inset pictures is written to a memory and is read from said memory for insertion into a sequence of main pictures, to be precise in accordance with the preamble of claim 1, and also to a circuit arrangement for picture-in-picture insertion, in particular for carrying out said method in accordance with the preamble of claim 3.

2. Description of the Related Art

Various methods and apparatuses for inserting one or more inset pictures into a main picture (PIP—Picture In Picture) are known. In this case, the inset pictures stored in the memory are read out synchronously with a main picture. Since the read-out speed is generally higher, in a manner corresponding to the decimation of the inset picture, than the write-in speed, a seam can occur in the inset picture on account of the write pointer being overtaken by the read pointer. In this case, the inset picture is composed of a current part and a preceding part, between which the seam runs.

In particular in the case where the two parts originate from different motion phases, a disturbing effect is produced since moving objects through which the seam passes are displayed in a distorted manner. Moreover, if the frequencies of the inset and main pictures do not correspond exactly, the seam drifts, which is perceived as particularly unpleasant.

Problems can arise in particular in the case where the main and inset pictures are present in different standards. For example, if the main picture is intended to be reproduced at a frame frequency of 60 Hz and the inset picture at a frame frequency of 50 Hz, the different raster positions cause periodic jumping of the picture at the differential frequency. For this case, in the known integrated picture-in-picture circuits, there is the possibility of changing to a so called fallback mode which is intended to avoid these disturbances. This mode is also referred to as field mode since only one of the two fields is written to the memory. This field is then displayed twice in each case, with the result that line doubling occurs in the representation. It does not matter which of these two fields is used.

Furthermore, this mode also enables a representation at a frame frequency of 100 Hz with minimal memory outlay, without continuous seam effects occurring. What is disadvantageous in this case, however, is that, in the field mode, a jump between the same rasters of different frames can occur, which causes a seam to be generated, although said seam becomes visible only in the case of moving pictures. A further disadvantage of this operating mode consists in the reduced vertical picture resolution.

In order to reduce the relative high memory requirement in the preferred frame mode, in many cases slight compression by a factor of between 0.5 and 0.8 is performed in particular in the case of relatively large pictures. One possible compression method is DPCM (differential pulse code modulation). In this method, the difference between successive pixels of a line is formed. This difference can be stored with a lower resolution, a non-linear quantization scheme being used as a basis.

In this case, however, the problem arises that the read pointer can overtake the write pointer during a line. In the event of picture storage without compression, in this case pixels are reproduced which belong chronologically to a preceding picture. In the case of compression, however, the content of such a line is mutilated since, after storage, decompression can be realized without errors only when the entire line content is consistent. The consequence of this is that when compression is employed, an error-free representation of both fields is possible only when no seam can occur. Consequently, in the case of picture signals with different standards or different frame frequencies, compression cannot be realized when the known reproduction methods are employed.

SUMMARY OF THE INVENTION

The invention is based on the object, therefore, of providing a method and a circuit arrangement of the type mentioned in the introduction with which, even in the frame mode, the picture data can be stored in compressed form in order to save memory space, without the risk of picture disturbances as a result of different write and read speeds.

This object is achieved by means of a method mentioned in the introduction which, in accordance with claim 1, is distinguished by the fact that an inset picture is written to the memory under addresses which in each case precede a previously written-in inset picture by a number of N lines, at the beginning of each line to be read, the instantaneous write address and also the speed difference between the write and read operations are used to determine whether, in the line, the write operation can be overtaken by the read operation, and in the case where such overtaking can occur, the read address is shifted by N lines to an identical line of a previously written-in inset picture, where the number N is chosen, in a manner dependent on a speed difference between the read pointer and the write pointer, to be at least large enough that a second overtaking cannot occur in a field.

The object is furthermore achieved by means of a circuit arrangement according to claim 3, which is provided in particular for carrying out said method.

The subclaims contain advantageous developments of the invention.

BRIEF DESCRIPTION OF THE DRAWINGS

Further details, features and advantages of the invention emerge from the following description of a preferred embodiment with reference to the drawing, in which.

DETAILED DESCRIPTION OF THE INVENTION

Figure 1:
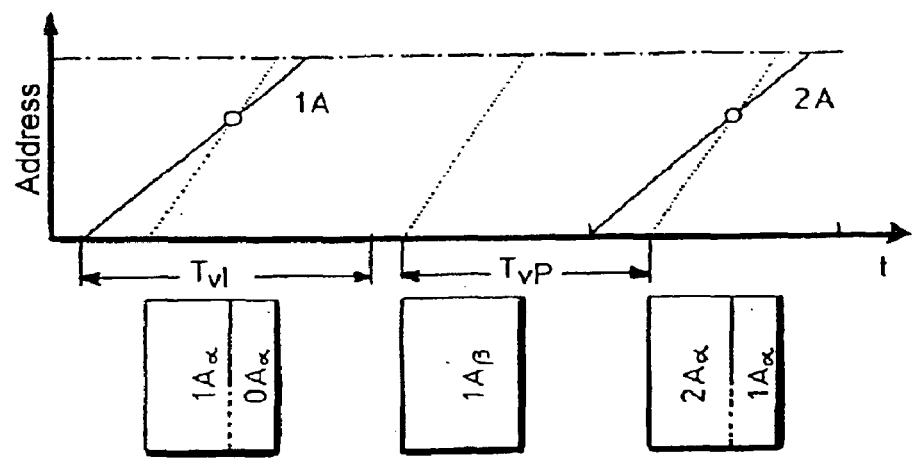
FIG. 1 shows a pointer representation for reading and writing picture data from and to the picture memory in accordance with the prior art.
Figure 2:
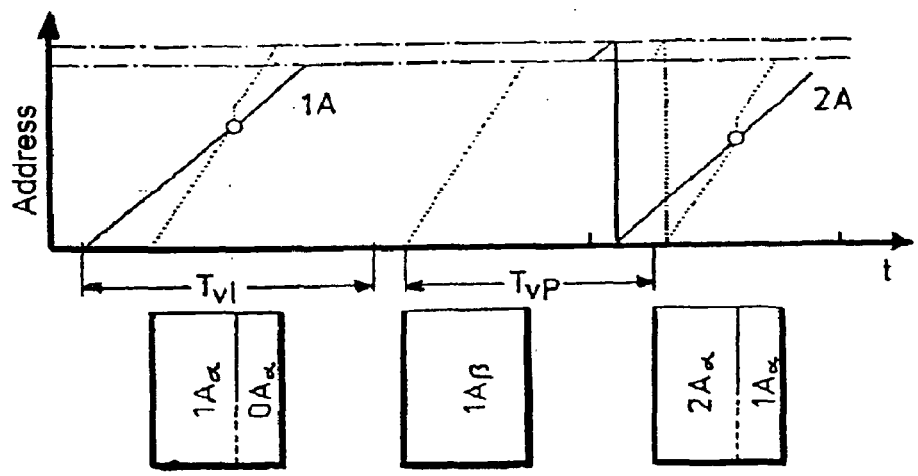
FIG. 2 shows a pointer representation in the case of a method according to the invention.

In the diagrams of FIGS. 1 and 2, the read pointers are indicated by dotted lines and the write pointers are indicated by solid lines. These pointers in each case represent the instantaneous value of an address counter for reading or writing a pixel from or to the picture memory. The gradient of the pointers represents the rate at which a number of memory cells are swept over within a specific period of time. As can be seen from the figures, the read pointer can thus overtake the write pointer.

The current fields are in each case specified below the time axes, the upper-case letters in each case designating a raster of an inset field and the lowercase Greek letters designating the raster of a main picture. The numerals illustrate the chronological sequence of these pictures.

In accordance with FIG. 1, the selected field raster (the A raster in the case illustrated) of a small picture is written to the picture memory. This means that writing and waiting are alternately effected for the duration of a field. This corresponds to subsampling both in the temporal direction and in the vertical direction by the factor 2. The fields are written continuously, beginning at a specific memory address, so that the next field of the same raster position overwrites the preceding field, identical lines and identical pixels in each case being situated under the same address in the memory. If the field data are simultaneously read from the memory, the write pointer can be overtaken by the read pointer. At the overtaking point, a jump then occurs between the pictures. By contrast, the repetition of the field intrinsically proceeds without any disturbance.

According to the invention, the fields are stored in such a way that each subsequent field of the same raster position is written to the memory at an address which precedes the previous field by exactly N lines.

As can be seen in FIG. 2, the consequence of this is that the previous field is not overwritten until N lines later. These N lines must be able to be additionally stored in the memory, so that the storage capacity must be designed accordingly.

Furthermore, the read and write pointers are checked at the beginning of each line to be read and it is determined whether the read pointer could overtake the write pointer during this line. In order to safeguard this prognosis, a specific minimum distance is added to the read pointer. If the read pointer with this distance is larger than the write pointer, then it must be assumed that overtaking would occur. In this case, the read pointer is immediately shifted by the abovementioned N lines, so that it now points to the same line of an older picture. This prevents overtaking, with the result that error-free decompression and, consequently, disturbance-free reproduction are possible.

The number N of lines to be additionally held in the memory must be determined in such a way that a second overtaking cannot occur in the same field. This number N is uniquely determined by the maximum speed difference to be expected on the basis of the different frame frequencies including tolerances thereof, and also the minimum vertical decimation, and is of the order of magnitude of about 1 to 24 lines in the case of a picture-in-picture processor.

Figure 3:
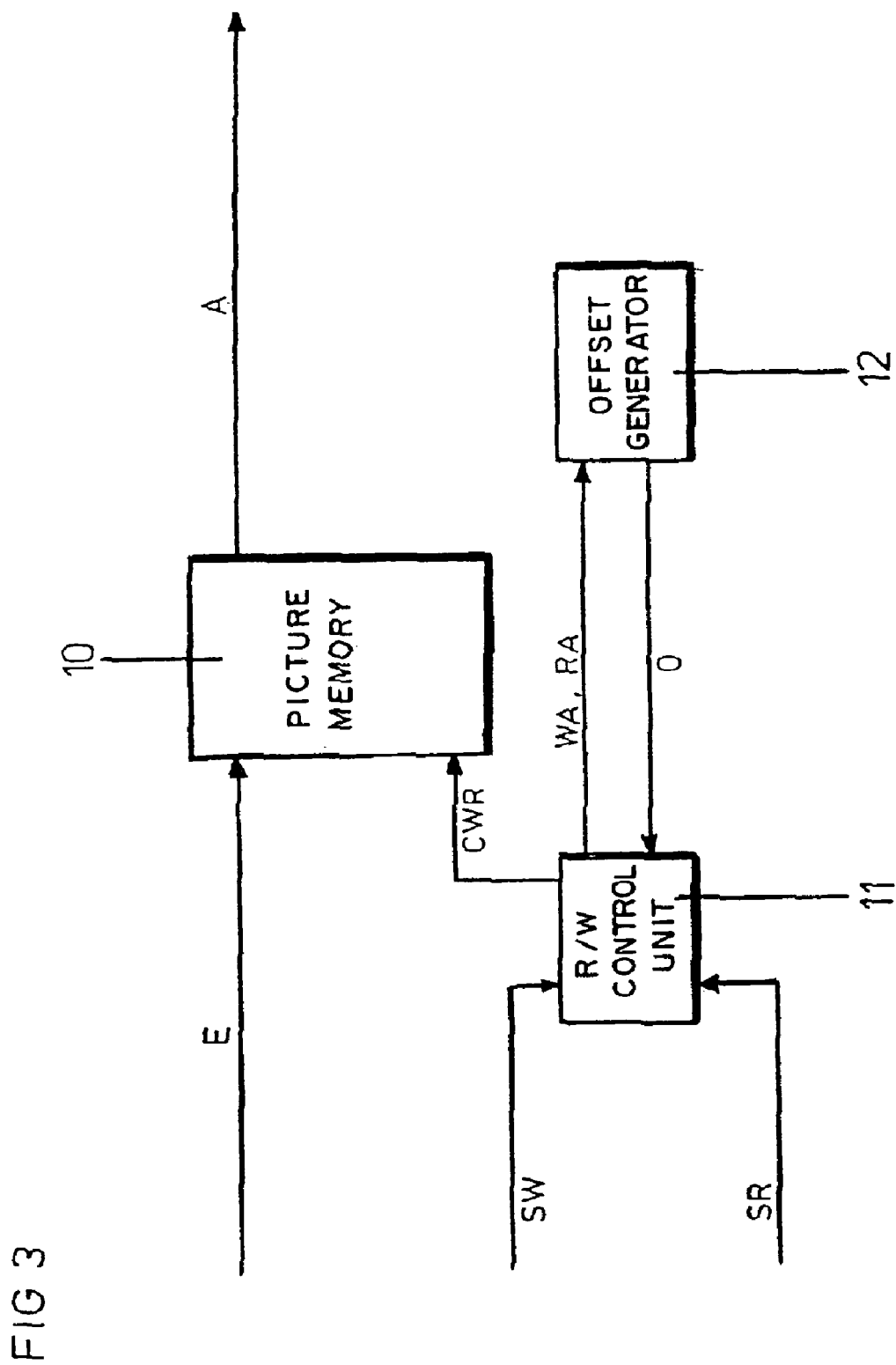
FIG. 3 shows a circuit arrangement according to the invention.

Finally, FIG. 3 shows a circuit arrangement for carrying out the method. The circuit arrangement essentially comprises a picture memory 10, a unit 11 for write and read control, and also a unit 12 for offset generation.

Picture data are fed to the picture memory 10 via an input terminal E. The picture data read from the picture memory 10 are transferred via an output terminal A for further picture processing and picture representation. A first start signal SW for writing a picture to the memory 10 and also a second start signal SR for reading a picture from the memory 10 are fed to the unit 11 for write and read control. In a manner dependent on these start signals, the unit 11 generates the corresponding write and read addresses, which are fed to the unit 12. The unit 11 generates the read/write address during reading/writing in a continuous manner, thereby enabling an unambiguous assignment between memory address and line. In this case, the read address is reset by the reading start signal to the value of the last write address at the beginning of writing, whereupon the normal continuous addressing begins anew with this start value. The write address is reset by the writing start signal to a value N lines before the value at the beginning of the last writing process, so that each new picture is written N lines before the old picture. The normal continuous addressing during writing then begins again with this value, said addressing corresponding in its function to the addressing during reading. The reading/writing is activated by the start signals. The start signals for the picture to be inserted and the picture to be stored are generated by the respective synchronization device. The start signal for writing is generated by a synchronization device which derives synchronizing signals from the inset picture. The start signal for reading is generated by a synchronization device which is synchronized with the main picture. The activity of the start signal and of further signals of the synchronization devices can influence the reading/writing, so that interruptions in the writing/reading sequence are possible, for example in order, by means of subsampling, to write only every nth pixel or every mth line or, alternatively, in order to interrupt the read process after the reading of a line of the inset picture for the duration of a field line until the inset position of a deeper line is reached. A further signal is fed to the apparatus (11), whereby changes in the address sequence are possible, for example in order to read a line repeatedly. The apparatus (12) monitors the write and read addresses in such a way that, if a possible overtaking of the write/read pointers is detected by the mechanisms already explained, a jump of the read pointer at the beginning of the line of reading by N lines in the positive direction is implemented. To that end, the offset signal 0 is generated and the apparatus (11) evaluated.

What we claim is:

1. A method for picture-in-picture insertion, in which a sequence of inset pictures is written to a memory and is read from said memory for insertion into a sequence of main pictures, characterized in the steps of:
    writing an inset picture to the memory under addresses which in each case precede a previously written-in inset picture by a number of N lines,
    at the beginning of each line to be read, the instantaneous write address and also the speed difference between the write and read operations determining whether, in the line, the write operation can be overtaken by the read operation, and
    in the case where such overtaking can occur, shifting the read address by N lines to an identical line of a previously written-in inset picture,
    where the number N is chosen, in a manner dependent on a speed difference between the read pointer and the write pointer, to be at least large enough that a second overtaking cannot occur in a field.

2. The method as claimed in claim 1,
    characterized in comprising the step of, in order to determine overtaking, adding to the read address an additional distance to the write address.

3. A circuit arrangement for picture-in-picture insertion having a picture memory and a unit for write and read control,
    characterized in that a unit (12) for generating an address offset is provided, which acts on the unit (11) for write and read control in such a way that an inset picture is written to the memory under addresses which in each case precede a previously written-in inset picture by a number of N lines,
    in which case a read address can be shifted, by the unit (11) for write and read control, by N lines to an identical line of a previously written-in inset picture if, in a line, a write operation can be overtaken by a read operation, and
    in which case the number N is chosen, in a manner dependent on a speed difference between the read operation and the write operation, at least to be large enough that a second overtaking cannot occur in a field.

* * * * *